US009543872B2

(12) United States Patent
Chen

(10) Patent No.: US 9,543,872 B2
(45) Date of Patent: Jan. 10, 2017

(54) POSITION SENSORLESS CONTROL METHOD FOR SWITCHED RELUCTANCE GENERATOR

(71) Applicant: China University of Mining and Technology, Xuzhou (CN)

(72) Inventor: Hao Chen, Xuzhou (CN)

(73) Assignee: China University of Mining and Technology, Jiangsu (CN)

( * ) Notice: Subject to any disclaimer, the term of this patent is extended or adjusted under 35 U.S.C. 154(b) by 259 days.

(21) Appl. No.: 14/344,887

(22) PCT Filed: Jan. 24, 2013

(86) PCT No.: PCT/CN2013/070932
§ 371 (c)(1),
(2) Date: Mar. 13, 2014

(87) PCT Pub. No.: WO2014/063454
PCT Pub. Date: May 1, 2014

(65) Prior Publication Data
US 2014/0340056 A1    Nov. 20, 2014

(30) Foreign Application Priority Data

Oct. 22, 2012 (CN) .......................... 2012 1 0403799

(51) Int. Cl.
*H02P 6/00* (2016.01)
*H02K 29/06* (2006.01)
(Continued)

(52) U.S. Cl.
CPC ................ *H02P 9/009* (2013.01); *H02J 5/00* (2013.01); *H02P 9/02* (2013.01); *H02P 25/0925* (2016.02)

(58) Field of Classification Search
CPC ....... H02P 25/085; H02P 25/08; H02P 25/083; H02P 9/40; H02P 6/16; H02P 6/085; H02P 6/18; H02P 25/086; H02P 6/182; H02P 2203/01; H02P 21/0035; H02K 1/246; H02K 16/04; H02K 21/222; H02K 47/04; B60L 2220/18; B60L 11/16; B60L 2240/429
See application file for complete search history.

(56) References Cited

U.S. PATENT DOCUMENTS 5,936,386 A * 8/1999 Heglund .................. H02P 9/40
318/701
2005/0099152 A1* 5/2005 Norman .................. H02P 6/18
318/801

(Continued)

*Primary Examiner* — Marlon Fletcher
(74) *Attorney, Agent, or Firm* — Miller Law Group, PLLC

(57) ABSTRACT

A control method for a switched reluctance generator employing dual switched-mode power converters does not require a position sensor. In the excitation stage, the upper tube and lower tube of the main switch of a phase in the power converter are switched on, and the phase current is detected. When the phase current rises to a preset threshold, the upper tube or lower tube of the main switch of the phase is switched off, changing the phase of the switched reluctance generator into a zero voltage natural freewheeling state. When the phase current drops to the valley value, the rotor position is the end position of maximum phase inductance of the phase. This rotor position is used as the switch-off position of the main switch of the phase of the switched reluctance generator, and the upper tube and lower tube for the main switch of the phase are switched off.

9 Claims, 2 Drawing Sheets

(51) Int. Cl.
*H02P 9/00* (2006.01)
*H02J 5/00* (2016.01)
*H02P 9/02* (2006.01)

(56) References Cited

U.S. PATENT DOCUMENTS

| | | | | |
|---|---|---|---|---|
| 2005/0116679 A1* | 6/2005 | Ramu | ................. | H02M 3/1582 318/700 |
| 2006/0091846 A1* | 5/2006 | Mayes | ................. | H02P 25/083 318/701 |
| 2014/0084816 A1* | 3/2014 | Ramu | .................... | H02P 27/06 318/139 |
| 2014/0340006 A1* | 11/2014 | Chen | ................... | H02P 25/083 318/254.1 |
| 2015/0207441 A1* | 7/2015 | Jordison | ............... | H02P 25/085 318/400.21 |

* cited by examiner

Figure 1
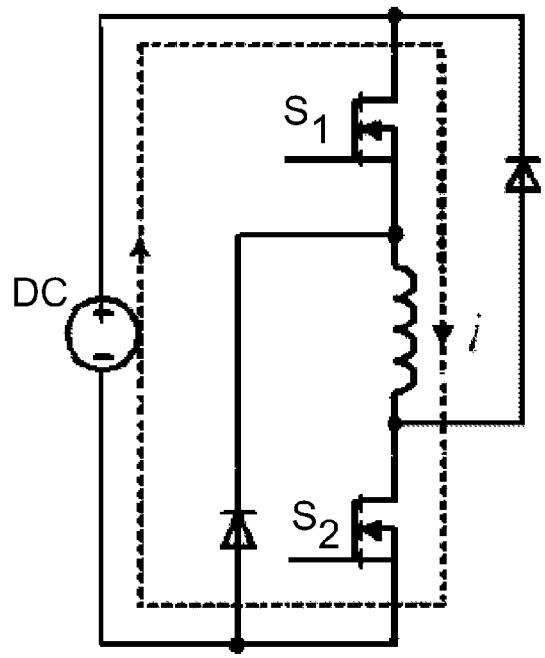
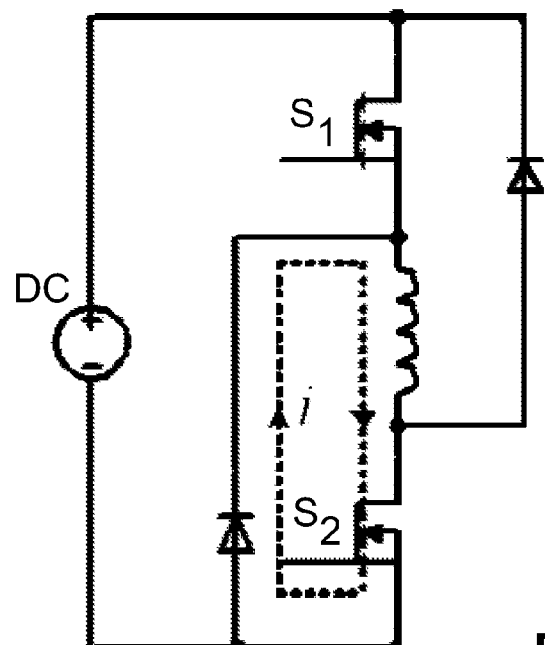
Figure 2

Figure 3
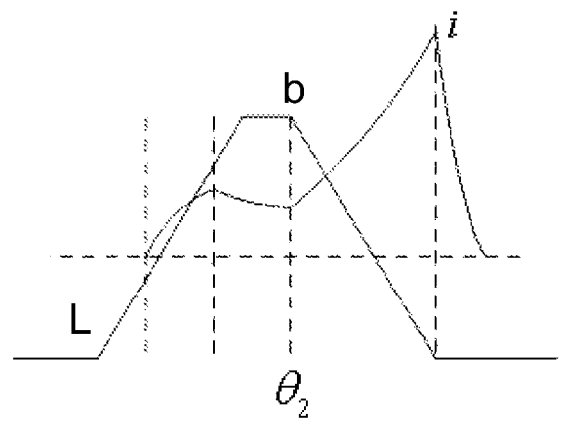
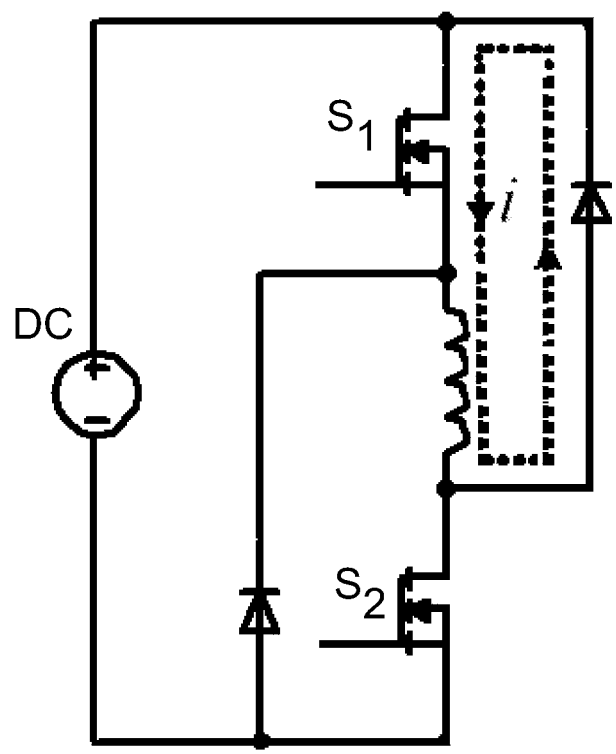
Figure 4

POSITION SENSORLESS CONTROL METHOD FOR SWITCHED RELUCTANCE GENERATOR

FIELD OF THE INVENTION

The present invention relates to a position sensorless control method for switched reluctance generator, which is applicable to switched reluctance generator systems that has different number of phases and employ dual switched-mode power converters for each phase.

BACKGROUND OF THE INVENTION

In switched reluctance generators, the rotor is made solely by electrical steel sheets stacked together, without brush, winding, or permanent magnet; the stator has centrally arranged windings. Therefore, switched reluctance generators have advantages such as solid and durable construction, low manufacturing cost, and easy maintenance, are suitable for use in harsh outdoor environments, and can achieve a very long service life that is incomparable among other types of generators. However, the existence of rotor position sensor compromises the advantage of simple construction of switched reluctance generators; especially, conventional position sensors often fail in harsh outdoor operating environments, resulting in degraded system reliability. In view of that, it is of great significance to develop a practical position sensorless control method for switched reluctance generators. The rotor position can be obtained by measuring the phase voltage and phase current of switched reluctance generator, and estimating the transient phase inductance of the generator through a state observer; however, a difficulty in the method is that an accurate nonlinear mathematical model of the switched reluctance generator system has to be established. The flux linkage or inductance characteristics of a given generator are measured in online or offline mode, a generator model can be established in the form of a table, fitting function, or neural network and stored in a controller, the rotor position can be deduced with the model through the flux linkage or inductance measured in real time when the generator operates in conjunction with the present phase current; however, the given motor is required to be modeled in advance in this method, the universality of which is limited. The rotor position at the end position of minimum phase inductance can be obtained through phase current gradient method by detecting the peak phase current in the inductance rising zone; that method is not suitable for phase current chopping control; the ON-OFF angle adjustment range is limited, and the speed adjustment range of switched reluctance generator is reduced during angular position control.

SUMMARY OF THE INVENTION

To overcome the drawbacks in the prior art, the present invention provides a control method for switched reluctance generator without position sensor, which detects the end position of maximum phase inductance of a phase, takes the position directly as the switch-off position for the main switch of the phase of the power converter in the switched reluctance generator, and thereby switches off the upper tube and lower tube in the power converter of the main switch of the phase.

The control method for switched reluctance generator without position sensor in the present invention comprises excitation power supply, windings of a switched reluctance generator, and a power converter composed of main switch and diodes, taking an upper tube S1 and a lower tube S2 of the main switch of a phase in the power converter into ON state in the excitation stage, wherein, 1) setting a threshold for the winding current of the phase, and detecting the winding current i of the phase;

2) switching off the upper tube S1 or lower tube S2 of the main switch of the phase in the power converter when the winding current i of the phase rises up to the preset threshold, so that the winding of the phase of the switched reluctance generator changes into zero voltage natural freewheeling state and the winding current i of the phase begins to drop; and 3) the rotor position of the switched reluctance generator is the end position b of maximum phase inductance of the phase when the winding current i of the phase drops to the valley value, acquiring the end position b of maximum phase inductance of the phase, directly taking the acquired start position b as the switch-off position $\theta_2$ of the main switch of the phase in the power converter of switched reluctance generator, and switching off the upper tube S1 and lower tube S2 of the main switch in the power converter.

Beneficial effects: the present invention doesn't require any additional external hardware and doesn't have to store flux linkage data of the generator; for a switched reluctance generator system that employs dual switched-mode power converters for each phase; in the excitation stage, after the upper tube S1 and lower tube S2 of the main switch of a phase in the power converter are switched on, detecting the phase current; the upper tube or lower tube of the main switch of the phase in the power converter is switched off when the current of the phase rises to a preset threshold, and the phase of the switched reluctance generator changes into zero voltage natural freewheeling state, and the phase current of begins to drop; when the phase current reaches to the valley value, the rotor position is the end position of maximum phase inductance of the phase, which is directly used as the switch-off position of the main switch of the phase of the switched reluctance generator in the power converter, and thus no rotor-position sensor is required, and the upper tube and lower tube of the main switch of the phase in the power converter are switched off. The present invention has high real-time feature, high dynamic response and stability, and high practicability and universality, and thus the present invention has wide application prospects. The present invention is of great significance for expanding the application domain of switched reluctance generator systems and improving the operational reliability of switched reluctance generators.

BRIEF DESCRIPTION OF THE DRAWINGS

FIG. 1 is a schematic diagram of the current path of a phase in the switched reluctance generator system in the present invention after the phase changes into excitation state;

FIG. 2 is a schematic diagram of current path of a phase in the switched reluctance generator system in the present invention after the upper tube S1 of the main switch of the phase is switched off and the phase changes into zero voltage natural freewheeling state;

FIG. 3 is a schematic diagram of the characteristics of phase inductance L and phase current i in the present invention; and FIG. 4 is a schematic diagram of current path of a phase in the switched reluctance generator system in the present invention after the lower tube S2 of the main switch of the phase is switched off and the phase changes into zero voltage natural freewheeling state.

DETAILED DESCRIPTION OF THE EMBODIMENTS

Hereunder the present invention will be detailed in embodiments with reference to the accompanying drawings:

Embodiment 1. A switched reluctance generator system that employs dual switched-mode power converters for each phase The system employs excitation power supply, windings of a switched reluctance generator, and a power converter composed of main switch and diodes, wherein, in the excitation stage, the upper tube S1 and lower tube S2 of the main switch of a phase in the power converter are switched on, setting a threshold for the winding current of the phase, and detecting the phase current i; the path of phase current i is shown in FIG. 1.

When the winding current i of the phase rises to the preset threshold, the upper tube S1 of the main switch of the phase in the power converter is switched off, and the phase in the switched reluctance generator changes into zero voltage natural freewheeling state, and the phase current i begins to drop; the path of phase current i is shown in FIG. 2; the characteristics of phase inductance L and phase current i are shown in FIG. 3.

When the winding current i of the phase drops to the valley value, the rotor position of the switched reluctance generator is the end position b of maximum phase inductance of the phase; acquiring the end position b of maximum phase inductance of the phase, directly taking the acquired start position b as the switch-off position $\theta_2$ of the main switch of the phase in the power converter of switched reluctance generator, and switching off the upper tube S1 and lower tube S2 of the main switch in the power converter, as shown in FIG. 3.

Embodiment 2. A switched reluctance generator system that employs dual switched-mode power converters for each phase The system employs excitation power supply, windings of a switched reluctance generator, and a power converter composed of main switch and diodes, wherein, in the excitation stage, the upper tube S1 and lower tube S2 of the main switch of a phase in the power converter are switched on, a threshold is set for the winding current of the phase, and the phase current i is detected; the path of phase current i is shown in FIG. 1.

When the winding current i of the phase rises to the preset threshold, the lower tube S2 of the main switch of the phase in the power converter is switched off, and the phase of the switched reluctance generator changes into zero voltage natural freewheeling state, and the phase current i begins to drop; the path of phase current i is shown in FIG. 4; the characteristics of phase inductance L and phase current i are shown in FIG. 3.

When the winding current i of the phase drops to the valley value, the rotor position of the switched reluctance generator is the end position b of maximum phase inductance of the phase; acquiring the end position b of maximum phase inductance of the phase, and directly taking the acquired start position b as the switch-off position $\theta_2$ of the main switch of the phase in the power converter of switched reluctance generator, and the upper tube S1 and lower tube S2 of the main switch in the power converter are switched off, as shown in FIG. 3.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention. The invention is not otherwise limited, except for the recitation of the claims set forth below.

What is claimed is:

1. A control method for a switched reluctance generator without a position sensor, and having a excitation power supply, windings of a switched reluctance generator, and a power converter composed of main switch and diodes with an upper tube S1 and a lower tube S2 in the power converter of the main switch of a phase in an ON state in the excitation stage, comprising the steps of:

setting a threshold for the winding current of the phase, and detecting the winding current i of the phase;

switching off either the upper tube S1 or the lower tube S2 in the power converter of the main switch of the phase when the winding current i of the phase rises to a preset threshold, so that the winding of the phase of the switched reluctance generator changes into a zero voltage natural freewheeling state and the winding current i of the phase begins to drop;

the rotor position of the switched reluctance generator is the end position b of maximum phase inductance of the phase when the winding current i of the phase drops to a valley value, acquiring the end position b of maximum phase inductance of the phase; and switching off the upper tube S1 and lower tube S2 of the main switch in the power converter.

2. The method of claim 1 wherein said switching off step switches off the lower tube S2.

3. The method of claim 1 wherein said switching off step switches off the upper tube S1.

4. A control method for a switched reluctance generator without a position sensor, and having a excitation power supply, windings of a switched reluctance generator, and a power converter composed of main switch and diodes with an upper tube S1 and a lower tube S2 in the power converter of the main switch of a phase in an ON state in the excitation stage, comprising the steps of:

setting a threshold for the winding current of the phase, and detecting the winding current i of the phase;

switching off either the upper tube S1 or the lower tube S2 in the power converter of the main switch of the phase when the winding current i of the phase rises to a preset threshold, so that the winding of the phase of the switched reluctance generator changes into a zero voltage natural freewheeling state and the winding current i of the phase begins to drop; and acquiring the end position b of maximum phase inductance of the phase when the rotor position of the switched reluctance generator is an end position b of maximum phase inductance of the phase when the winding current i of the phase drops to a valley value.

5. The control method of claim 4 further comprising the steps of:

taking the end position b of maximum phase inductance of the phase as the acquired switch-off position $\theta_2$ of the main switch of the phase in the power converter of switched reluctance generator; and switching off the upper tube S1 and lower tube S2 of the main switch in the power converter.

6. A method of controlling a switched reluctance generator without a position sensor, and having a excitation power supply, windings of a switched reluctance generator, and a power converter composed of main switch and diodes with an upper tube S1 and a lower tube S2 in the power converter of the main switch of a phase movable between an ON state and an OFF state, comprising the steps of:

placing the upper tube S1 and the lower tube S2 into the OFF state in the excitation stage;

setting a threshold for the winding current of the phase;

detecting the winding current i of the phase;

when the winding current i of the phase rises to a preset threshold, switching either the upper tube S1 or the lower tube S2 into the OFF state so that the winding of the phase of the switched reluctance generator changes into a zero voltage natural freewheeling state and the winding current i of the phase begins to drop; and acquiring the end position b of maximum phase inductance of the phase when the rotor position of the switched reluctance generator is an end position b of maximum phase inductance of the phase when the winding current i of the phase drops to a valley value.

7. The method of claim 6 further comprising the steps of:

taking the end position b of maximum phase inductance of the phase as the acquired switch-off position $\theta_2$ of the main switch of the phase in the power converter of switched reluctance generator; and switching off the upper tube S1 and lower tube S2 of the main switch in the power converter.

8. The method of claim 7 wherein said switching step places only the upper tube S1 into the OFF state.

9. The method of claim 7 wherein said switching step places only the lower tube S2 into the OFF state.

* * * * *